United States Patent
Gal et al.

(10) Patent No.: US 11,425,019 B2
(45) Date of Patent: *Aug. 23, 2022

(54) INSPECTING NETWORK PERFORMANCE AT DIAGNOSIS POINTS

(71) Applicant: salesforce.com, inc., San Francisco, CA (US)

(72) Inventors: Shauli Gal, Mountain View, CA (US); Satish Raghunath, Sunnyvale, CA (US); Kartikeya Chandrayana, San Francisco, CA (US); Gabriel Tavridis, San Francisco, CA (US); Kevin Wang, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,810

(22) Filed: Feb. 1, 2021

(65) Prior Publication Data

US 2021/0367874 A1 Nov. 25, 2021

Related U.S. Application Data

(63) Continuation of application No. 16/660,732, filed on Oct. 22, 2019, now Pat. No. 10,911,347, which is a
(Continued)

(51) Int. Cl.
| | |
|---|---|
| *G06F 15/173* | (2006.01) |
| *H04L 43/16* | (2022.01) |
| *H04L 43/08* | (2022.01) |
| *H04L 41/046* | (2022.01) |
| *H04L 41/0816* | (2022.01) |

(Continued)

(52) U.S. Cl.
CPC ............ *H04L 43/16* (2013.01); *H04L 41/046* (2013.01); *H04L 41/0816* (2013.01); *H04L 43/04* (2013.01); *H04L 43/08* (2013.01); *H04L 43/12* (2013.01); *H04L 41/064* (2013.01); *H04L 41/0893* (2013.01)

(58) Field of Classification Search
None
See application file for complete search history.

(56) References Cited

U.S. PATENT DOCUMENTS 7,184,935 B1 2/2007 Cohen et al.
8,086,708 B2 12/2011 Breitgand et al.
(Continued)

OTHER PUBLICATIONS

United States Patent and Trademark Office, U.S. Appl. No. 15/675,479, Final Office Action dated Oct. 31, 2019.
(Continued)

*Primary Examiner* — Quang N Nguyen
(74) *Attorney, Agent, or Firm* — Wong & Rees LLP; Kirk D. Wong

(57) ABSTRACT

A data-driven approach to network performance diagnosis and root-cause analysis is presented. By collecting and aggregating data attribute values across multiple components of a content delivery system and comparing against baselines for points of inspection, network performance diagnosis and root-cause analysis may be prioritized based on impact on content delivery. Recommended courses of action may be determined and provided based on the tracked network performance analysis at diagnosis points.

20 Claims, 6 Drawing Sheets

Related U.S. Application Data continuation of application No. 15/722,746, filed on Oct. 2, 2017, now Pat. No. 10,454,803.

(51) Int. Cl.
  *H04L 43/04* (2022.01)
  *H04L 43/12* (2022.01)
  *H04L 41/0893* (2022.01)
  *H04L 41/0631* (2022.01)

(56) References Cited

U.S. PATENT DOCUMENTS

| | | | |
|---|---|---|---|
| 8,966,055 | B2 | 2/2015 | Mittal et al. |
| 9,143,379 | B1* | 9/2015 | Berger ............... H04L 69/40 |
| 9,923,793 | B1 | 3/2018 | Gore et al. |
| 10,164,842 | B2 | 12/2018 | Rizzi et al. |
| 10,212,063 | B2 | 2/2019 | Nataraj et al. |
| 2002/0173857 | A1 | 11/2002 | Pabari et al. |
| 2006/0101269 | A1* | 5/2006 | Moskowitz ........ G06Q 30/0283 |
| | | | 713/176 |
| 2006/0168055 | A1 | 7/2006 | Wixted et al. |
| 2007/0083515 | A1 | 4/2007 | Gwizdaloski |
| 2008/0225748 | A1 | 9/2008 | Khemani et al. |
| 2009/0106349 | A1 | 4/2009 | Harris |
| 2011/0246897 | A1* | 10/2011 | Lee ................... H04L 12/6418 |
| | | | 715/735 |
| 2012/0226804 | A1* | 9/2012 | Raja .................. H04L 43/028 |
| | | | 709/224 |
| 2013/0173778 | A1* | 7/2013 | Hsy ..................... H04L 43/14 |
| | | | 709/224 |
| 2015/0244580 | A1 | 8/2015 | Saavedra |
| 2015/0295778 | A1 | 10/2015 | Hsiao et al. |
| 2015/0339263 | A1 | 11/2015 | Ata et al. |
| 2016/0125293 | A1 | 5/2016 | Patel et al. |
| 2016/0182328 | A1* | 6/2016 | Bhasin ................. H04L 43/04 |
| | | | 709/224 |
| 2017/0112379 | A1 | 4/2017 | Swiston et al. |
| 2017/0171040 | A1 | 6/2017 | Randolph et al. |
| 2017/0188059 | A1 | 6/2017 | Major |
| 2017/0293845 | A1 | 10/2017 | McAllister et al. |
| 2017/0302539 | A1 | 10/2017 | Park et al. |
| 2017/0359735 | A1* | 12/2017 | Jain ................. H04W 72/0453 |
| 2018/0287856 | A1 | 10/2018 | Whitner et al. |
| 2019/0052518 | A1 | 2/2019 | Gal et al. |
| 2019/0104037 | A1 | 4/2019 | Gal et al. |
| 2019/0355269 | A1* | 11/2019 | Pan ......................... G06K 9/46 |
| 2020/0052995 | A1 | 2/2020 | Gal et al. |
| 2020/0162336 | A1 | 5/2020 | Gonguet |
| 2021/0126836 | A1* | 4/2021 | Patel ................. H04L 43/0852 |
| 2021/0243839 | A1* | 8/2021 | Krishnaswamy ..... H04W 24/10 |

OTHER PUBLICATIONS

United States Patent and Trademark Office, U.S. Appl. No. 15/675,479, Final Office Action dated Aug. 23, 2021.
United States Patent and Trademark Office, U.S. Appl. No. 15/675,479, Non-Final Office Action dated Apr. 5, 2019.
United States Patent and Trademark Office, U.S. Appl. No. 15/675,479, Non-Final Office Action dated Nov. 4, 2020.
United States Patent and Trademark Office, U.S. Appl. No. 15/722,746, Notice of Allowance dated Jun. 13, 2019.
United States Patent and Trademark Office, U.S. Appl. No. 16/660,732, Notice of Allowance dated Oct. 5, 2020.

* cited by examiner

INSPECTING NETWORK PERFORMANCE AT DIAGNOSIS POINTS

CROSS-REFERENCE TO RELATED APPLICATIONS

This application is a Continuation of U.S. patent application Ser. No. 16/660,732 filed Oct. 22, 2019, now U.S. Pat. No. 10,911,347 Issued Feb. 21, 2021, which is a Continuation of U.S. patent application Ser. No. 15/722,746 filed on Oct. 2, 2017, now U.S. Pat. No. 10,454,803 Issued Oct. 22, 2019, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to identifying anomalies in content delivery and, in particular, to inspecting network performance at diagnosis points using a data driven approach.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still has to weather the vagaries of the network, operating environment, and end device.

Transmission Control Protocol (TCP) plays an important role in the content delivery business: it provides a reliable, ordered, and error-checked delivery of a stream of octets between applications running on hosts communicating by an IP network. Major Internet applications, such as the World Wide Web, email, remote administration, and file transfer, rely on TCP. Many applications (apps) rely heavily on network transactions to deliver a functional user experience. When failures relating to apps are observed by users, app owners seek to find the root-cause. Challenges faced by app owners include sifting through mountains of data to decide which metrics may be of interest, lack of domain expertise (e.g., network infrastructure, client-side, or server-side topology), lack of measurement data to diagnose the issues affecting one or more parts of the network, and a lack of prioritization of the issues that are impacting performance of the app.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
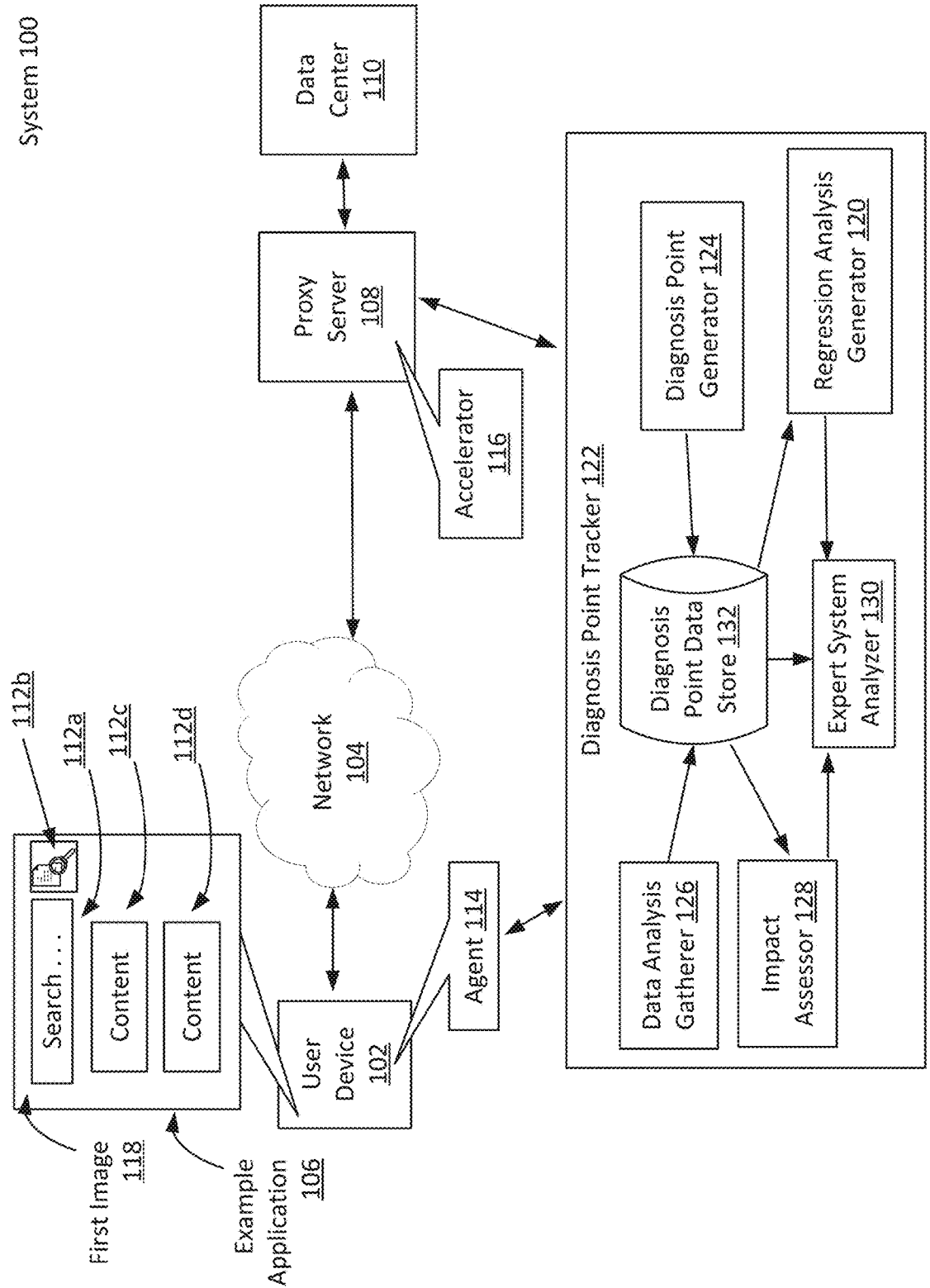
FIG. 1 illustrates a high-level block diagram, according to an embodiment of the invention.

Example embodiments, which relate to cognitive analysis of network performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example Embodiments are Described Herein According to the Following Outline

1. General Overview
2. Measuring Data Attribute Values Based on Network Transactions
3. Tracking Diagnosis Points for Anomalies
4. Diagnosis Point Generation
5. Inspecting Network Performance Based on Impact at Diagnosis Points
6. Implementation Mechanisms—Hardware Overview
7. Equivalents, Extensions, Alternatives, and Miscellaneous

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, 4G, older technologies, etc.), WiFi (e.g., 802.11xx series of standards, etc.), satellite, microwave, etc. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.

b. The diversity in devices, operating system software and form factors results in a unique challenge from the perspective of user experience.

c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to optimize data delivery. On the client side, a device's make and model, operating system (OS), OS application programming interfaces (APIs), and one or applications may impact performance of an application. Within an access network, various network infrastructure attributes may affect a network transaction between a client and a server, such as various network technologies, round-trip latency, bandwidth, network operator, geography, and time. Meanwhile, on the server side, a server's OS, location, network peering, and application software may further impact app performance and affect a network transaction of data between a client and the server. Pinpointing a root cause of a failure of a functional user experience becomes a difficult challenge because of the enormity of data available to an app owner, lack of domain expertise on the part of an app developer investigating network infrastructure and/or server issues, lack of measurement data to diagnose network issues, and a lack of a prioritization framework to attach a priority to a problem by estimating a benefit of fixing the problem.

A network performance root cause analysis may provide notifications of issues affecting performance at various parts of a multiple-component system. A structure may be provided that partitions the problem into distinct areas of the application, network, and/or server infrastructure such that an app owner may quickly identify the area where the problem lies and locate the appropriate resources to start solving the problem. Key metrics may be correlated across multiple points in the network to provide informative insights. The issues may also be prioritized based on an impact on performance so that an app owner may select an area to start solving a problem that will objectively have the most impact.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Measuring Data Attribute Values Based on Network Transactions

The performance of data delivery is closely tied to the operating conditions within which the end-device is operating. With ubiquitous wireless access over cellular and WiFi networks, there is a lot of volatility in operating conditions, so acceleration techniques must adapt to such a network by adapting to these conditions, e.g., the performance achievable over a private WiFi hotspot is very different from that with a cellular data connection. An accelerator 116, as illustrated in FIG. 1, dynamically adapts to these conditions and picks the best strategies based on the context.

The context captures the information about the operating conditions in which data transfer requests are being made. This includes, but is not limited to, any combination of:

Type of device, e.g., iPhone, iPad, Blackberry, etc.
    This may also include the hardware version of the device and manufacturer information.

Device characteristics, e.g., the type of its modem, CPU/GPU, encryption hardware, battery, NFC (Near Field Communication) chipset, memory size and type or any other hardware information that impacts performance Mobility of device, e.g., whether the device is on a moving vehicle/train etc., or is stationary/semi-stationary.

Operating System on the device.

Operating System characteristics, e.g., buffering, timers, public and hidden operating system facilities (APIs), etc.
    This may also include operating system limitations such as number of simultaneous connections allowed to a single domain, etc.

Usage information related to various device elements, e.g., Memory, Storage, CPU/GPU etc.

Battery charge and mode of powering the device.

Time of day.

Location where available.

IP Address and port numbers.

Network type, e.g., WiFi or Cellular, or 3G/4G/LTE, etc., or Public/Home WiFi, etc.
    SSID (Service Set Identifier) in WiFi networks.
    802.11 network type for WiFi networks.

Service Provider information, e.g., AT&T or Verizon for cellular, Time Warner or Comcast for WiFi, etc.

Strength of signal from the access point (e.g., Wi-Fi hot spot, cellular tower, etc.) for both upstream and downstream direction.

Cell-Tower or Hot-Spot identifier in any form.

Number of sectors in the cell tower or hot spot.

Spectrum allocated to each cell tower and/or sector.

Any software or hardware limitation placed on the hot-spot/cell tower.

Any information on the network elements in the path of traffic from device to the content server.

Firewall Policy rules, if available.

Any active measurements on the device, e.g., techniques that measure one-way delay between web-server and device, bandwidth, jitter, etc.

Medium of request, e.g., native app, hybrid app, web-browser, etc.
  Other information describing the medium, e.g., web browser type (e.g., Safari, Chrome, Firefox etc.), application name, etc.

Any other third party software that is installed on the device which impacts data delivery performance Content Type, e.g., image, video, text, email, etc.
  Also includes the nature of content if it is dynamic or static.

Content Location, e.g., coming from origin server or being served from a CDN (Content Delivery Network).
  In the case of a CDN, any optimization strategies being employed, if available.

Recent device performance statistics, e.g., dropped packets, bytes transferred, connections initiated, persistent/on-going connections, active memory, hard disk space available, etc.

Caching strategies if any, that are available or in use on the device or by the application requesting the content.

In the case of content, where multiple objects have to be fetched to completely display the content, the order in which requests are placed and the order in which objects are delivered to the device. The request method for each of these objects is also of interest.

Based on the operating context, a cognitive engine may recommend, but is not limited to, any combination of: end-device based data delivery strategies and accelerator-based data delivery strategies.

End-device based data delivery strategies refer to methods deployed by an application (an application could be natively running on the end-device operating system, or running in some form of a hybrid or embedded environment, e.g., within a browser, etc.) to request, receive, or transmit data over the network. These data delivery strategies include, but are not limited to, any combination of:

Methods used to query the location of service point, e.g., DNS, etc.
  This may involve strategies that include, but are not limited to, any combination of: choosing the best DNS servers based on response times, DNS prefetching, DNS refreshing/caching, etc.

Protocols available for data transport, e.g., UDP, TCP, SCTP, RDP, ROHC, etc.

Methods to request or send data as provided by the operating system, e.g., sockets, CFHTTP or NSURL-Connection in Apple's iOS, HttpUrlConnection in Google's Android, etc.

Session oriented protocols available for requests, e.g., HTTP, HTTPS, FTP, RTP, Telnet, etc.

Full duplex communication over data transport protocols, e.g., SPDY, Websockets, etc.

Caching and or storage support provided in the Operating System.

Compression, right sizing or other support in the devices to help reduce size of data communication.

Transaction priorities which outline the order in which network transactions are to be completed:
  E.g., this may be a list of transactions where the priority scheme is simply a random ordering of objects to be downloaded.

Content specific data delivery mechanisms, e.g., HTTP Live Streaming, DASH,

Multicast, etc.
  Encryption support in the device:

Also includes secure transport mechanisms, e.g., SSL, TLS, etc.

VPN (Virtual Private Network) of any kind where available and/or configured on the device.

Any tunneling protocol support available or in use on the device.

Ability to use or influence rules on the device which dictate how the data needs to be accessed or requested or delivered.
  This includes, but is not limited to, any combination of: firewall rules, policies configured to reduce data usage, etc.

Ability to pick the radio technology to use to get/send data. For example, if allowed, the ability to choose cellular network to get some data instead of using a public Wi-Fi network.

Ability to run data requests or process data in the background.

Threading, locking, and queuing support in the Operating System.

Ability to modify radio power if available.

Presence and/or availability of any error correction scheme in the device.

In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304396, entitled "Cognitive Data Delivery Optimizing System," filed Nov. 12, 2013, and which is hereby incorporated by reference in its entirety for all purposes. Embodiments are not tied down by assumptions on the current nature of the system. A diagnosis point tracker 122 may use raw network traffic data to generate a data analysis for assessing impacts at diagnosis points, in an embodiment.

FIG. 1 and the other figures use like reference numerals to identify like elements. A letter after a reference numeral, such as "112a," indicates that the text refers specifically to the element having that particular reference numeral. A reference numeral in the text without a following letter, such as "112," refers to any or all of the elements in the figures bearing that reference numeral (e.g. "112" in the text refers to reference numerals "112a," "112b," "112c" and/or "112d" in the figures). Only four user interface elements 112 are shown in FIG. 1 in order to simplify and clarify the description.

As illustrated in FIG. 1, a system 100 includes a user device 102 that communicates data requests through a network 104. A proxy server 108 may receive the data requests and communicate the requests to a data center 110. A diagnosis point tracker 122 may receive, or gather, information from the proxy server 108 and/or an agent 114 operating on a user device 102 and store information in a diagnosis point data store 132, in an embodiment. For example, data attribute values may be measured at a proxy server 108, such as quantifying how long a server, located in a data center 110, takes to respond if the proxy server 108 is close enough to the server. Other data attribute values may be gathered by a data analysis gatherer 126 and stored in the diagnosis point data store 132. Similarly, a client-side data attribute values may be from an agent 114 operating on the user device 102, such as measuring a download complete time of an object at the agent 114. This measurement can capture the time taken to place the request on the network, the time taken for the server to respond and the time taken for the response to reach the user and render on the user's screen. As a result, the download complete time of an object is a composite measurement of the system that includes the user device 102, the network 104, proxy server 108, and data center 110.

An example application 106 may run on the user device 102. The example application 106 may include a first image 118, a user interface element 112a (e.g., a search box, data entry area, pull-down menu, etc.), a user interface element 112b (e.g., a search button, activation area, etc.), and user interface elements 112c and 112d (e.g., selectable content, data elements, etc.). A diagnosis point may be generated for loading a first image 118 in the example application 106, as an example. Other diagnosis points may be configured and/or generated by a diagnosis point generator 124. For example, a response time for a user-initiated search to render selectable content results may be configured as a diagnosis point that is tracked by the diagnosis point tracker 122.

Each database record in the diagnosis point data store 132 may include data attribute values associated with one or more points of inspection. A point of inspection may be defined by an administrator user or app owner user. A point of inspection may be a data attribute that may contribute to a failure in the user experience, such as a failure to retrieve a data object or a perceived slowdown in network connectivity. For example, data representing outcomes of the network transaction such as the download complete time, may be captured in a database record in the diagnosis point data store 132 as a data attribute value associated with the point of inspection (download complete time). Performance metrics such as latency in download complete time compared to a baseline defined by an administrator user may also be stored in the diagnosis point data store 132, in one embodiment.

Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that monitors the real-time operating conditions, participates and performs active network measurements, and executes recommended strategies. The agent 114 may be supplied in a software development kit (SDK) and is installed on the user device 102 when an application that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-to-server leg latency, etc.

An accelerator 116 sits in the path of the data traffic within a proxy server 108 and executes recommended strategies in addition to gathering and measuring network-related information in real-time. The accelerator 116 may propagate network policies to the proxy server 108, in one embodiment. In another embodiment, the agent 114 may implement one or more network policies. For example, the optimal number of simultaneous network connections may be propagated as a network policy through the network 104 to the agent 114 embedded on the user device 102. As another example, the transmission rate of file transfer may be limited to 20 MB/sec by the accelerator 116 as a network policy.

Once a multitude of data attribute values associated with requests between user devices 102 and the data centers 110 are logged in the diagnosis point data store 132, it becomes possible to aggregate this data by inspection point. For example, aggregated data by inspection point at an app measuring response time might be transformed into an alert that states an app has a high response time in comparison to a baseline and that the impact of fixing the response time may be a certain percentage reduction in response time. Other examples may include measuring the number of abandoned sessions as a percentage of total sessions, the measured time of a launch to first image request, image server(s) latency, image size of objects sent over different types of networks, and small image (e.g., less than 4 KB) requests ratio. Data analysis, such as the above examples, may be gathered by a data analysis gatherer 126, in one embodiment.

A diagnosis point tracker 122 may include a data analysis gatherer 126 that may store data attribute values captured at an agent 114 and a proxy server 108, respectively, into the diagnosis point data store 132. An expert system analyzer 130 may then retrieve data attribute values from the diagnosis point data store 132, individually and/or aggregated, to form recommendations for an administrator user to troubleshoot and/or diagnose root-causes of perceived slowdowns in the performance of the app. The expert system analyzer 130 may include various rules-based functionality to determine recommendations, as configured by an administrator user of the diagnosis point tracker 122. An impact assessor 128 may determine an impact of an anomaly at a diagnosis point based on an acceptable baseline. A regression analysis generator 120 may determine a regression analysis based on received data attribute values that may indicate a trend line data, forecasting data, and so forth based on historical data. A diagnosis point generator 124 may enable an administrator user to configure a point in the system to be a diagnosis point, or point of inspection.

The expert system analyzer 130 may include one or more functions, such as forming a baseline for key attributes, tracking defined inspection points, or items, for anomalies, and assessing the impact of an inspection item. To determine if there is a problem, the expert system analyzer 130 may maintain a baseline of expected behavior associated with a defined inspection point. The baseline may be a combination of expert input (e.g., manual entry of a baseline value by an administrator) and an aggregate function of data from historical data. For example, the download complete time for static objects of 100 kilobytes (KB) in size over LTE networks in the US West coast may have a median value of 200 milliseconds (ms) over the past 7 days, while an expert input may indicate an acceptable baseline to be 250 ms to override this formulaic (e.g., an aggregate function of data from historical data) choice. In this way, the expert system analyzer 130 may be configured by one or more of the expert input and a formulaic choice, in an embodiment.

Key attributes may be defined by administrator users, in one embodiment. In other embodiments, key attributes may be selected based on past historical data, such as metrics that have had a history of problems and/or issues. Key attributes may then be configured and generated as diagnosis points by a diagnosis point generator 124. Other attributes may be defined as tracked points of inspection by administrators, in an embodiment. For example, a high response time, high number of 3xx HTTP status codes for images indicating further action may need to be taken by a user agent to complete the request due to the content of the request being moved to a different URL, slow network speeds, and so on may be example data attributes that occur at different areas of the system. For example, response time may be measured at the app, whereas response time for a server may be measured at the server. Further, a high number of 3xx HTTP status codes may be measured at a server, whereas a network speed may be measured at a network.

The expert system analyzer 130 may include as input data from the diagnosis point data store 132, data from the impact assessor 128, and/or data from the regression analysis generator 120. For example, a high number of 3xx HTTP status codes may indicate redirection, thus having an impact on speed and/or responsiveness. The impact assessor 128 may determine a measure of impact based in time units, such as 100 ms. A regression analysis generator 120 may also determine that the number of 3xx HTTP status codes may increase based on the number of codes recorded in the past. This information may be provided to the expert system analyzer 130 in determining a recommendation to fix one or more issues that are causing the 3xx HTTP status codes to be generated.

3. Tracking Diagnosis Points for Anomalies

Figure 2:
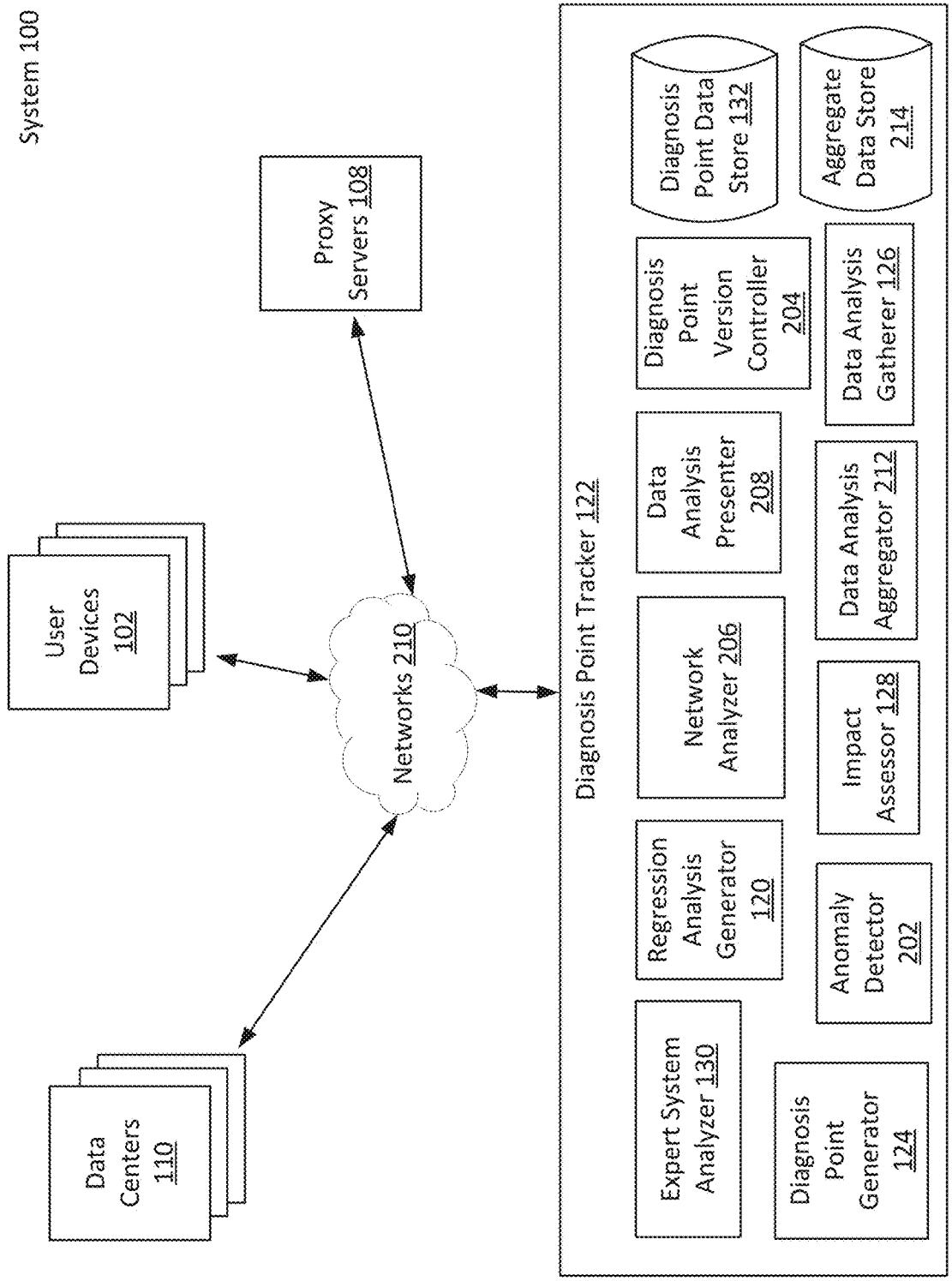
FIG. 2 illustrates a high-level block diagram, including an example diagnosis point tracker according to an embodiment of the invention.

FIG. 2 illustrates a high-level block diagram, including an example performance analyzer, according to an embodiment. A diagnosis point tracker 122 may include an expert system analyzer 130, a regression analysis generator 120, a network analyzer 206, a data analysis presenter 208, a diagnosis point version controller 204, a diagnosis point data store 132, an aggregate data store 214, a diagnosis point generator 124, an anomaly detector 202, an impact assessor 128, a data analysis aggregator 212, and a data analysis gatherer 126, in one embodiment. The diagnosis point tracker 122 may communicate data over one or more networks 210 with other elements of system 100, such as user devices 102, one or more proxy servers 108, and one or more data centers 110.

A data analysis gatherer 126 may collect one or more data attribute values associated with data requests between user devices 102 and data centers 110 through one or more proxy servers 108. In one embodiment, a data attribute value may be collected by an agent 114 of a user device 102. Additionally, a data analysis gatherer 126 may collect one or more data attribute values associated with data requests between data centers 110 and user devices 102 through one or more proxy servers 108. A data attribute value may be collected by the server-side collector 112 from a proxy server 108 that is near the data center 110. In another embodiment, information about networks 210 may be gathered as data attribute values associated with the data requests between the user devices 102 and data centers 110 by a data analysis gatherer 126. This information about one or more of the networks 210 may be stored in the diagnosis point data store 132 by the agent 114 or by the proxy server 108, in an embodiment.

A diagnosis point generator 124 may enable an administrator user of the diagnosis point tracker 122 to select a data point, or point of inspection, in which data attribute values are gathered, in one embodiment. For example, an administrator user may identify a data point as an inspection point to track over time. In another embodiment, a data point may be selected based on historical data that indicates the data point to have a large impact on performance and perceived slowdowns on the app. This data point, after selection, may be referred to as a diagnosis point, in one embodiment. In this way, the data point may be selected by the diagnosis point generator 124 based on past occasions where an administrator performed a modification to network and/or device parameters that had a large impact on performance based on historical data. One or more parameter modifications (e.g., performing a fix) may be performed at the diagnosis point to achieve better network performance.

An anomaly detector 202 may use one or more methods or techniques to detect an anomaly. For example, a statistical method may be used to detect an anomaly as a data attribute value having a variance larger than a threshold set by the administrator user, in one embodiment. As another example, a baseline may be inputted by the administrator user such that an anomaly is detected having various levels, such as moderate, severe, extreme, and so forth, based on the impact of the anomaly on performance. In a further embodiment, an anomaly may be detected based on a baseline and its variance from the standard deviation (the baseline). Other methods of anomaly detection may be used by the anomaly detector 202.

An impact assessor 128 may determine an impact of an anomaly based on a projected change in a metric of interest that can be considered desirable. For example, if the image size was higher by 20% from the baseline for LTE networks, the impact assessor 128 may compute the additional time spent downloading those bytes empirically from the data store values and project that as the impact for this inspection item. As a result, if 10 images are downloaded in a median LTE session and resizing them would result in a savings of 60 ms each, the best case savings would be 600 ms. This impact may be presented to an administrator user as a benefit, in one embodiment. The value of the impact may be expressed in time savings or other types of savings, such as less abandoned sessions.

A data analysis presenter 208 may present data analysis based on the collected data attribute values around an inspection point. For example, an administrator user may be presented with a user interface that enables the user to view, at a glance, data analysis about the collected data attribute values in a tabular format according to the version of the app that was released. An app inspection report may be generated by the data analysis presenter 208, in one embodiment, that shows the detailed information about the collected data attribute values, such as columns of data including the name of the inspection point, topology, network, value, baseline, and benefit (impact). More, or less, columns of data may be presented by the data analysis presenter 208 in other embodiments. In another embodiment, data attribute values may be plotted on graphs or presented against other types of data and presented to a user. For example, aggregated data attribute values, such as an indication of a number of aggregated warnings triggered at an inspection point or an aggregated percentage of impact of not resizing images to a threshold size, may be transformed into alerts, and the number of alerts may be plotted as a graph and organized by time of day and date. The graph may be generated by the data analysis presenter 208 and displayed to a user via a graphical user interface.

A data analysis aggregator 212 aggregates data attribute values over a fixed period of time (e.g., a month, a week, a day, etc.) for each inspection point. Additionally, a data analysis aggregator 212 may aggregate over other parameters, including the version of the application or the network technology. When domain experts perform root cause analyses, they arrive at a description of the problem. This description is called an inspection item, or inspection point. For example, an inspection item may be the size of image requests over LTE networks, and this may have been determined to be the cause of high latency when the value of the image size was higher than desired. A data analysis aggregator 212 may aggregate data, such as image size, and determine an aggregate data metric over a period of time, such as a day, and determine the aggregate data metric, such as a median of the image sizes of requests throughout the day. Once the aggregate data metric is determined from data attribute values stored in the diagnosis point data store 132, the aggregate data metric may be stored in an aggregate data store 214, in an embodiment. Based on a baseline, an anomaly detector 202 may determine an anomaly. An anomaly may be displayed on a user interface presented by a diagnosis point tracker 122, such as a dashboard illustrated in FIG. 5 or other user interfaces presented on user devices 102 connected to the diagnosis point tracker 122 through networks 210. In one embodiment, anomalies may be displayed on a user interface upon generation by a data analysis presenter 208. In another embodiment, anomalies may be displayed upon request according to user configurations of the user interface.

An expert system analyzer 130 may generate a diagnosis and/or recommendation based one or more data attribute values. For example, when a diagnosis point is deemed to be a problem, the diagnosis point tracker 122 may identify the metrics that are triggering the problem. If the download time of the first image is an inspection item, the diagnosis point tracker 122 may examine if the app read time was high, or if the access network transmission rate was low, or if the server response time was high. Depending on the component that is correlated with the problem, the expert system analyzer 130 flags the component of the system for further analysis. This flag may be in the form of an anomaly detected by the anomaly detector 202. This helps to drastically reduce root-cause analysis time for the app owner. An example indication by the expert system analyzer 130 may then be "The download complete time for the first image of the app is high in US/New York time zone. The corresponding server response time for these Clients was higher than baseline. Recommendation is to examine server component. Impact 600 ms per user session." Further, this data may be delineated over time by application versions and aides in regression analysis. Questions such as "what version of the app did this problem first appear" or "has this problem happened in the server component in the past revisions" may be answered by tracking anomalies associated with the inspection points over time. As a result of more efficient analysis of system problems, the use of inspection points and data-driven alerts to performance issues increases the efficiency of the overall system performance, server and/or client computing performance, and also helps in responding to problems that cause network performance issues in a more efficient manner Additionally, the use of inspection points and data-driven alerts further improves the technology of the underlying system. The techniques described herein enable the expert system analyzer to improve one or more components of the system by identifying parameters that may be modified to enhance the system. As a result of the expert system analyzer, one or more components of the system are improved to achieve higher performance.

4. Diagnosis Point Generation

Figure 3:
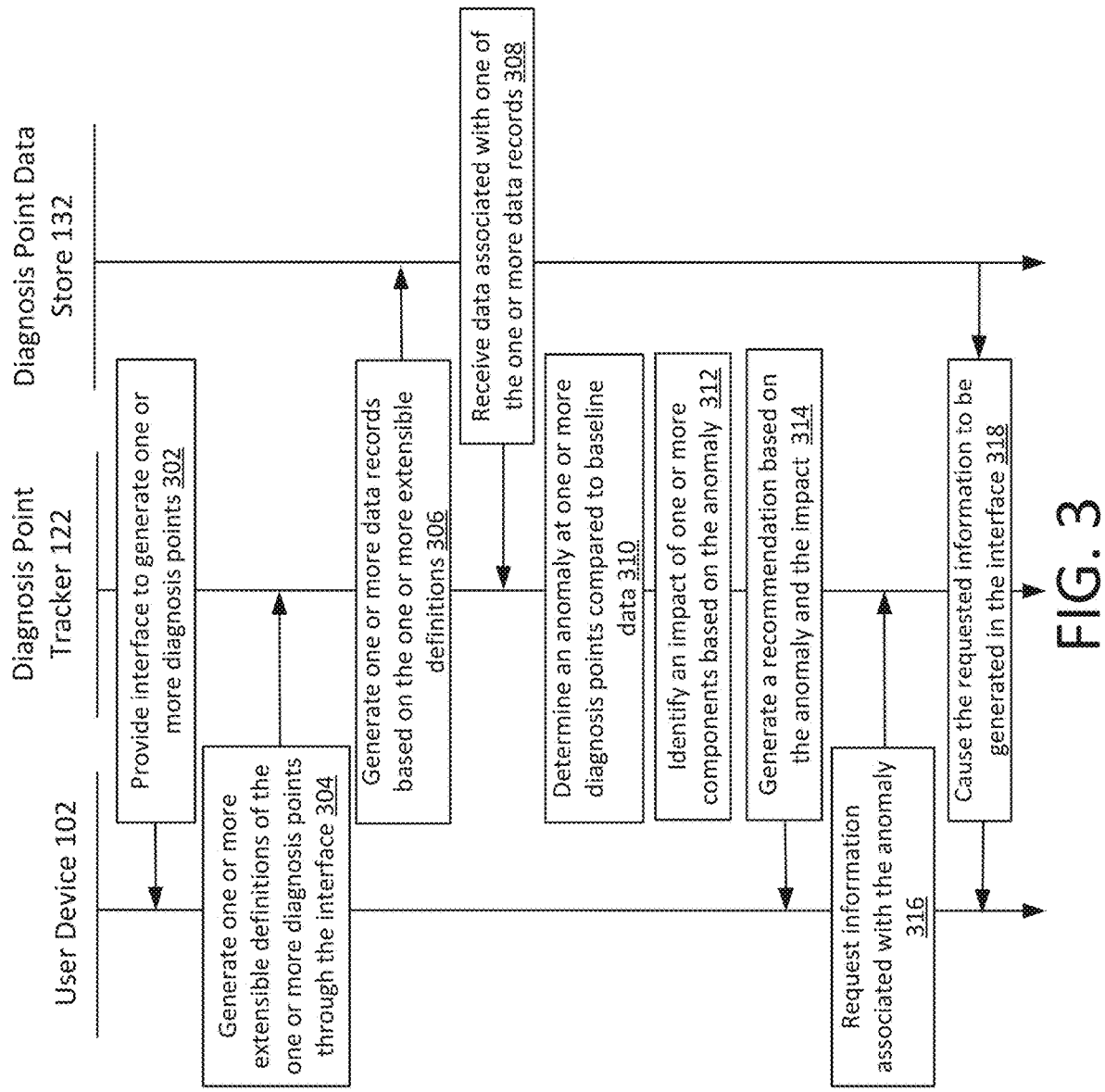
FIG. 3 illustrates a high-level interaction flow diagram of diagnosis point generation, according to an embodiment of the invention.

FIG. 3 illustrates a high-level interaction diagram of diagnosis point generation, according to an embodiment. A diagnosis point tracker 122 may provide an interface to generate one or more diagnosis points 302 to a user device 102. A user device 102 may generate 304 one or more extensible definitions of the one or more diagnosis points through the interface. In response, the diagnosis point tracker 122 may generate 306 one or more data records based on the one or more extensible definitions. These data records are stored in the diagnosis point data store 132.

A diagnosis point tracker 122 may receive 308 data associated with one of the one or more data records from the diagnosis point data store 132. An anomaly may be determined 310 at one or more diagnosis points compared to baseline data. Various methods and/or techniques may be used to determine 310 an anomaly at one or more diagnosis points. For example, statistical analysis methods, such as determining a median, average, standard deviation, moving average, or other statistical method, may be used to determine 310 an anomaly in an embodiment. In a further embodiment, data may be aggregated in the one or more data records such that the data received 308 from the diagnosis point data store 132 may include a total number, or summation, of values, such as a number of abandoned sessions, computed as a percentage of a larger number, such as a total number of sessions.

An anomaly is determined 310 by comparing captured data to baseline data. For example, an anomaly may be determined 310 using a data analysis of the data attribute values captured in comparison to baseline data for the diagnosis points. For example, the response time for a server may be high if it is higher than a baseline response time for the server. An impact of the anomaly may be identified 312 using a tiered analysis in one embodiment, such as a moderate, high, or extreme rating, based on rules and/or configuration settings by an administrator user. In other embodiments, an impact of the anomaly may be identified 312 as a quantitative value.

An impact of one or more components may be identified 312 based on the anomaly. The performance analysis may be triggered by one or more components in the system. The potential problem areas may include the client system (user device 102), the access network (network 104), and/or the server (problems on a data center 110 may be identified by a proxy server 108 in some proximity to the data center 110). As described above, the impact may be computed, or projected, based on a calculated savings, in time or other unit of measure, using the baseline data. In this way, the impact of the one or more components may be used to prioritize the selected points of inspection. Additionally, because the identified impact may be distributed amongst different components in different topologies (e.g., client, network, or server), the selected points of inspection may be further prioritized by domain expertise. For example, an app owner may have limited expertise in handling a network infrastructure issue that is identified as having a large impact on app performance. As a result, the app owner may delegate that task to one having the right expertise to handle the point of inspection. By correlating the multiple components that may be affecting an app and projecting the estimated impact of each selected point, the diagnosis point tracker 122 provides a streamlined root-cause analysis experience for the administrator user. This more efficient analysis of system problems using inspection items enables automatic or operator-initiated modifications to system parameters that increases efficiency of the overall system performance, in an embodiment.

Figure 5:
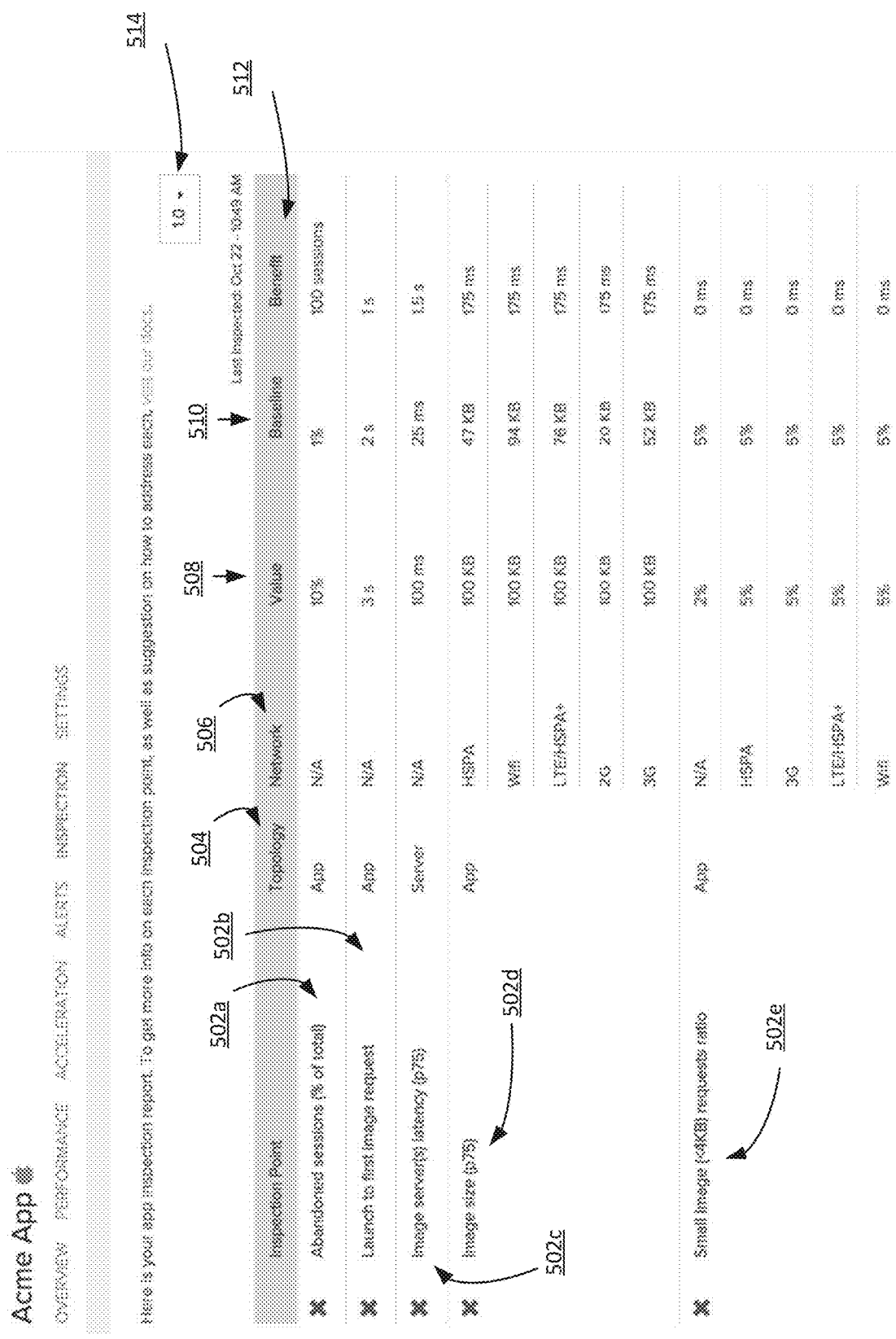
FIG. 5 is example screenshots of a presentation of inspecting network performance at diagnosis points, according to an embodiment of the invention.

A recommendation may be generated 314 based on the anomaly and the impact. A recommendation may be generated 314 based on rules configured by administrator users. For example, a recommendation to fix a server issue causing a high number of 3xx HTTP status codes may be generated 314 if the data attribute value received is higher than a baseline. Rules may be tailored for specific points of inspection, in an embodiment. The recommendation being generated 314 may cause the recommendation to be presented at the user device 102, in one embodiment. Information associated with the anomaly may then be requested 316 from the user device 102. The diagnosis point tracker 122 may then cause 318 the requested information from the diagnosis point data store 132 to be generated in the interface. The requested information may be generated in a display through a user interface accessible by the administrator user, in an embodiment. For example, data analysis presenter 208 may display data associated with the anomaly and determined impact in an example dashboard as illustrated in FIG. 5.

Figure 4:
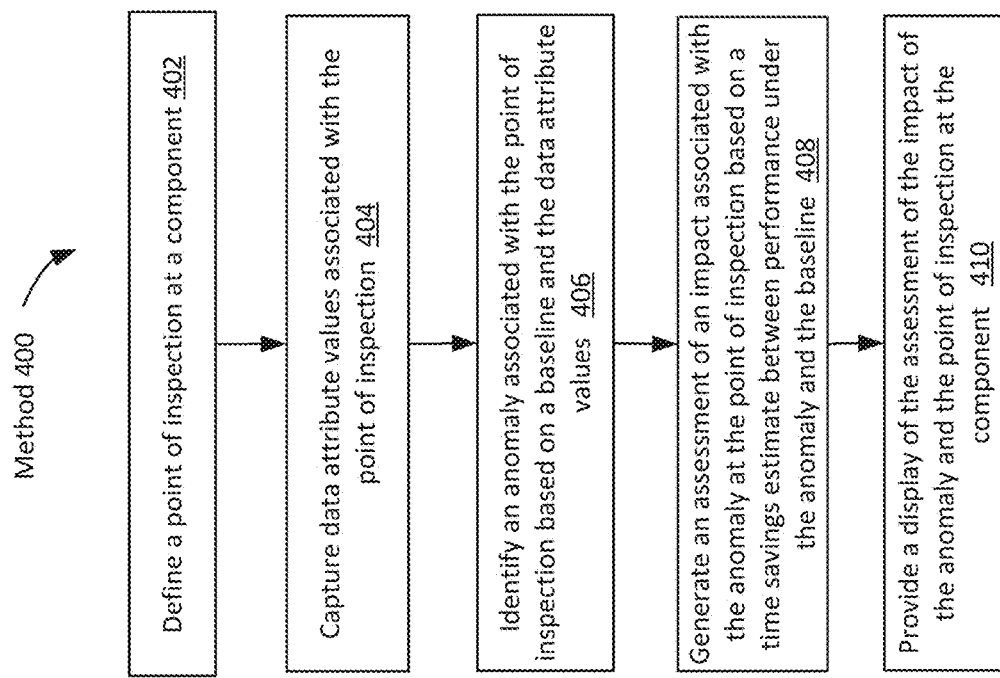
FIG. 4 illustrates a flowchart for inspecting network performance at diagnosis points, according to an embodiment of the invention.

FIG. 4 illustrates a flowchart for inspecting network performance at diagnosis points, according to an embodiment of the invention. Method 400 may be used in network performance analysis, in an embodiment. A point of inspection may be defined 402 at a component. In one embodiment, key points of inspection may be defined by administrator users. In other embodiments, a point of inspection may be defined 402 based on historical data indicating whether past versions of the app experienced problems at that metric.

Data attribute values associated with the point of inspection may then be captured 404. For example, a client agent, or an agent 114, may measure attributes end-to-end from the perspective of the user. Measuring download completion time of an object at the client agent captures the time taken to place the request on the network, the time taken for the server to respond, and the time taken for the response to reach the user and render on the user's screen. This data attribute value, the download complete time of an object at the agent 114, is a composite metric comprised of multiple metrics that can be captured and verified at other components of the system, in one embodiment. In another embodiment, the composite metric may be captured as a single data attribute value. For example, a download complete time of an object, as measured at agent 114, may be captured as a single data attribute value, such as a simple time measurement from the viewpoint of the agent 114. In contrast, a composite metric may be the sum of multiple metrics of download completion times of one or more objects at multiple components of the system, such as through the network, in the data center, and back to the user device. Other data attribute values may be captured 404 at different components, such as access networks within a network 104, and at proxy server 108 located near a data center 110. In one embodiment, information about the network 104 and/or data center 110 may be captured using third party services.

An anomaly associated with the point of inspection may be identified 406 based on a baseline and the data attribute values. The anomaly may be identified 406 using rules configured by an administrator user, or based on a threshold from the baseline. An assessment of an impact associated with the anomaly at the point of inspection may be generated 408 based on a time savings estimate between performance under the anomaly and the baseline, as described above. A display of the assessment of the impact of the anomaly and the point of inspection at the component may then be provided 410. The display of the assessment of the impact of the anomaly and the point of inspection may be provided 410 by a data analysis presenter 208, for example, as an example dashboard illustrated at FIG. 5.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a large amount of information about the network available in the transit traffic itself—from billions of devices consuming data. This information that describes network operating characteristics and defines efficacy of data delivery strategies is called a "network imprint".

5. Inspecting Network Performance Based on Impact at Diagnosis Points

FIG. 5 illustrates example screenshots of a graphical presentation of inspecting network performance at diagnosis points, or inspection points, according to an embodiment of the invention. FIG. 5 illustrates an example screenshot of a report on inspection points for an app. Points of inspection 500 include an abandoned sessions inspection point 502a, a launch to first image request inspection point 502b, an image server latency inspection point 502c, an image size inspection point 502d, and a small image (<4 KB) requests ratio inspection point 502e. As further illustrated in the screenshot, columns of data are presented to the administrator user, such as topology indicator 504, network indicator 506, value indicator 508, baseline indicator 510, and benefit indicator 512. As shown, an inspection point 502, or data attribute, may have a single value, such as 10% for abandoned sessions inspection point 502a, multiple baselines, such as various sizes listed for image size inspection point 502d, or multiple values, such as 2% and 5% for small image requests ratio inspection point 502e. Note that the benefit indicator 512 may also be referred herein as an impact. Using a dropdown menu 514, different data attribute values may be displayed according to the different versions of the app. Here, data attribute values associated with version 1.0 of the app is displayed.

Inspection items may be continually updated and new points of inspection may be added. Inspection items may be specified in a machine-readable form as functions of attributes measured by the client agent (agent 114) and the proxy (proxy server 108). This allows correlating metrics across various components of the system and enables partitioning the problem. Additionally, more efficient analysis of system problems is another benefit of using inspection items and data-driven alerts to performance issues as outlined above. This may enable automatic or operator-initiated modifications to system parameters that increases efficiency of the overall system performance, increases the efficiency of server and/or client computing performance, and aides in the systematic handling of problems that cause network performance issues from the viewpoint of the client device.

The approaches described herein allow embodiments to continually enhance and improve components of the system. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
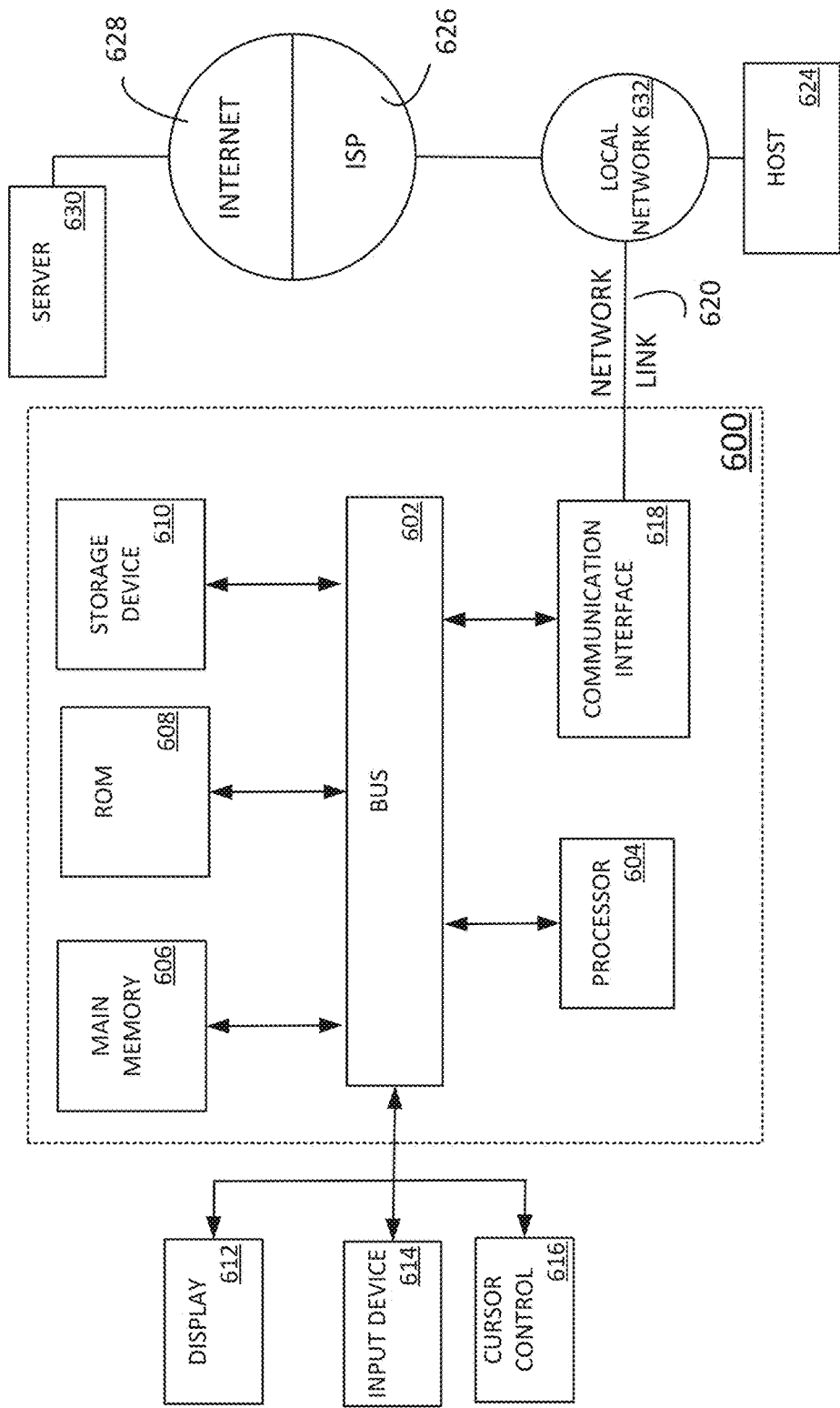
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is device-specific to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using device-specific hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Equivalents, Extensions, Alternatives, and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    determining a diagnosis point associated with a component of a content delivery system;
    receiving data associated with the component;
    generating a metric associated with the diagnosis point based on the data, wherein the metric comprises one or more data attributes associated with one or more sub-components of the component;
    responsive to the metric indicating an occurrence of an anomaly, identifying one or more sub-components of the component that are likely contributors to an outcome associated with the metric and
    generating a repair recommendation for a sub-component of the one or more sub-components based on a set of rules.

2. The method as recited in claim 1, wherein the component comprises an agent resident on a user device communicating with the content delivery system, and wherein the data is received from the agent.

3. The method as recited in claim 1, wherein the component comprises a traffic monitor server communicatively coupled to a server in the content delivery system, wherein the traffic monitor server monitors traffic between the server and one or more user devices, wherein the data is received from the traffic monitor server, and wherein the data is associated with the server.

4. The method as recited in claim 1, wherein the component comprises a traffic monitor server communicatively coupled to a plurality of servers in a datacenter of the content delivery system, wherein the traffic monitor server monitors traffic between one or more servers of the plurality of servers and one or more user devices, wherein the data is received from the traffic monitor server, and wherein the data is associated with the one or more servers.

5. The method as recited in claim 1, wherein the determining the diagnosis point is based on historical data of problems experienced at the diagnosis point.

6. The method as recited in claim 1, wherein the metric comprises a performance metric comparing a data attribute of the data to a baseline value.

7. The method as recited in claim 1, further comprising:
    generating a description of the anomaly and a system impact description for display to a user.

8. The method as recited in claim 1, further comprising:
    generating a description of performance metrics over time for different application versions to show when the anomaly occurred.

9. The method as recited in claim 1, further comprising:
    aggregating data attribute values for the diagnosis point over a period of time;
    generating an aggregate data metric for the diagnosis point;
    causing the aggregated data metric to be displayed to a user.

10. The method as recited in claim 1, wherein the generating the metric associated with the diagnosis point combines the data with aggregated data associated with the diagnosis point to generate the metric.

11. The method as recited in claim 1, wherein the generating a repair recommendation is performed by an expert system.

12. One or more non-transitory computer-readable storage media, storing one or more sequences of instructions, which when executed by one or more processors cause performance of:
    determining a diagnosis point associated with a component of a content delivery system;
    receiving data associated with the component;
    generating a metric associated with the diagnosis point based on the data, wherein the metric comprises one or more data attributes associated with one or more sub-components of the component;

responsive to the metric indicating an occurrence of an anomaly, identifying one or more sub-components of the component that are likely contributors to an outcome associated with the metric; and generating a repair recommendation for a sub-component of the one or more sub-components based on a set of rules.

13. The one or more non-transitory computer-readable storage media as recited in claim 12, wherein the component comprises an agent resident on a user device communicating with the content delivery system, and wherein the data is received from the agent.

14. The one or more non-transitory computer-readable storage media as recited in claim 12, wherein the component comprises a traffic monitor server communicatively coupled to a server in the content delivery system, wherein the traffic monitor server monitors traffic between the server and one or more user devices, wherein the data is received from the traffic monitor server, and wherein the data is associated with the server.

15. The one or more non-transitory computer-readable storage media as recited in claim 12, wherein the component comprises a traffic monitor server communicatively coupled to a plurality of servers in a datacenter of the content delivery system, wherein the traffic monitor server monitors traffic between one or more servers of the plurality of servers and one or more user devices, wherein the data is received from the traffic monitor server, and wherein the data is associated with the one or more servers.

16. The one or more non-transitory computer-readable storage media as recited in claim 12, wherein the metric comprises a performance metric comparing a data attribute of the data to a baseline value.

17. The one or more non-transitory computer-readable storage media as recited in claim 12, further comprising:

aggregating data attribute values for the diagnosis point over a period of time;

generating an aggregate data metric for the diagnosis point;

causing the aggregated data metric to be displayed to a user.

18. The one or more non-transitory computer-readable storage media as recited in claim 12, wherein the generating the metric associated with the diagnosis point combines the data with aggregated data associated with the diagnosis point to generate the metric.

19. The one or more non-transitory computer-readable storage media as recited in claim 12, wherein the generating a repair recommendation is performed by an expert system.

20. An apparatus, comprising:
one or more processors; and
a memory storing instructions, which when executed by the one or more processors, cause the one or more processors to perform:
determine a diagnosis point associated with a component of a content delivery system;
receive data associated with the component;
generate a metric associated with the diagnosis point based on the data, wherein the metric comprises one or more data attributes associated with one or more sub-components of the component;
responsive to the metric indicating an occurrence of an anomaly, identify one or more sub-components of the component that are likely contributors to an outcome associated with the metric; and
generate a repair recommendation for a sub-component of the one or more sub-components based on a set of rules.

\* \* \* \* \*